US006596799B1

United States Patent
Harada

(10) Patent No.: US 6,596,799 B1
(45) Date of Patent: Jul. 22, 2003

(54) GRANULE FOR CERAMIC GREEN BODY, CERAMIC GREEN BODY, AND SINTERED BODY THEREOF

(75) Inventor: Hiroshi Harada, Tokyo (JP)

(73) Assignee: TDK Corporation, Tokyo (JP)

( * ) Notice: Subject to any disclaimer, the term of this patent is extended or adjusted under 35 U.S.C. 154(b) by 93 days.

(21) Appl. No.: 09/705,908

(22) Filed: Nov. 6, 2000

(30) Foreign Application Priority Data

Nov. 4, 1999 (JP) .......................................... 11-313329

(51) Int. Cl.⁷ ................................................ C08K 3/18
(52) U.S. Cl. ....................................... 524/431; 524/442
(58) Field of Search .................................. 524/442, 431

(56) References Cited

U.S. PATENT DOCUMENTS

| | | | | |
|---|---|---|---|---|
| 3,865,774 A | * | 2/1975 | Malone ...................... 260/29.6 |
| 4,492,783 A | * | 1/1985 | Tanaka ........................ 524/430 |
| 4,496,506 A | * | 1/1985 | Sakato ......................... 264/109 |
| 5,034,451 A | * | 7/1991 | Tanaka ........................ 524/557 |
| 5,478,784 A | * | 12/1995 | Shibata ......................... 501/97 |
| 5,587,010 A | * | 12/1996 | Shibasaki .............. 106/287.17 |
| 6,008,281 A | * | 12/1999 | Yang .......................... 524/322 |
| 6,166,122 A | * | 12/2000 | Tanuma ....................... 524/430 |

FOREIGN PATENT DOCUMENTS

| | | | |
|---|---|---|---|
| JP | 3-31660 | 5/1991 | ........... C04B/35/00 |
| JP | 5-159918 | 6/1993 | ............. H01F/1/34 |
| JP | 6-287069 | 10/1994 | |
| JP | 7-17460 | 3/1995 | ......... C04B/35/628 |
| JP | 9-030865 | 2/1997 | |
| JP | 10-59776 | 3/1998 | ......... C04B/35/632 |
| JP | 2000-272970 | 10/2000 | |

OTHER PUBLICATIONS

Patent Abstract of Japan 10–059776 Mar. 3, 1998.
Patent Abstract of Japan 05–159918 Jun. 25, 1993.

* cited by examiner

Primary Examiner—Edward J. Cain
(74) Attorney, Agent, or Firm—Sughrue Mion, PLLC

(57) ABSTRACT

A ceramic granule containing a raw material ceramic powder and a binder component comprising a polyvinyl alcohol, in which the polyvinyl alcohol possesses an average saponification degree of not less than 90.0 mol % and not more than 98.0 mol % excels in the flowability, the mold-packing property, and the anti-sticking property, and has a well-balanced properties of conflicting properties of the crushing property at a low pressure and the anti-collapse property, and capable of continuously producing a ceramic product.

17 Claims, 10 Drawing Sheets

C: Comparative Example    E: Example

C: Comparative Example    E: Example

C: Comparative Example  E: Example

C: Comparative Example  R: Reference

C: Comparative Example     R: Reference

C: Comparative Example          R: Reference

C: Comparative Example   E: Example

GRANULE FOR CERAMIC GREEN BODY, CERAMIC GREEN BODY, AND SINTERED BODY THEREOF

BACKGROUND OF THE INVENTION

1. Field of the Invention

The present invention relates to a granule for ceramic green body, a ceramic green body and a ceramic sintered body obtained by using the same, and particularly to a granule for ceramic green body which can provide a green body excelling in formability, a ceramic green body and a ceramic sintered body obtained thereof.

2. Description of Related Art

Ceramics have been utilized in various fields inclusive of electronic parts. In this course, ceramics is obtainable by granulating a raw material powder for ceramics together with a binder to provide ceramic granules, forming the ceramic granules to provide a ceramic green body, and sintering the ceramic green is body.

Conventionally, among the various processes which have been utilized for producing a ceramic green body, a dry pressure process has been widely used as a rule. For example, ceramic granules produced either by spray-drying aqueous slurry prepared from a ceramic raw material, a binder, and water by means of a spray dryer or by stirring and mixing a ceramic raw material powder with a binder solution followed by repeating drying and oscillating extruding are formed under pressure to produce a ceramic green body. Sintering the green body thus produced gives a ceramic sintered body.

In order to produce a ceramic green body, the granules for a ceramic green body (hereinafter simply referred to as "ceramic granules") are required to have the following characteristics:

(1) The ceramic granules should have flowability within a suitable range, and a good packing property during the course of packing the ceramic granules into a mold in a uniform manner.
(2) The ceramic granules should be crushed at a low pressure (typically from 29.4 to 147.0 MPa) during the course of molding (hereinafter referred to as "a crushing property at a low pressure").
(3) Ingredients such as fine particles contained in the ceramic granule should not be stuck to a mold or the like (hereinafter referred to as "anti-sticking properties").
(4) The ceramic granules are not collapsed during the course of the storage, transportation, or agitation when they are packed into a mold, or due to collision with each other (hereinafter referred to as "an anti-collapse property").
(5) The ceramic granules have suitable bulk density so that they flow out of the mold during the course of packing them into a mold, or of molding (hereinafter referred to as "a mold-packing property")

Particularly, the ceramic particles are required to possess conflicting characteristics, i.e., "the crushing property at a low pressure" and "the anti-collapse property".

Various processes have been suggested in order to satisfy these requirements. For example, Japanese unexamined Patent Publication No. 5-159918 and Japanese examined Patent Publication No. 7-17460 disclose processes for improving the flowability and the crushing property at a low pressure utilizing specific dispersants in the preparation of an aqueous slurry.

Japanese examined Patent Publication No. 3-31660 and Japanese unexamined Patent Publication No. 10-59776 disclose processes for improving the flowability and the crushing property at a low pressure of the ceramic granules by decreasing the segregation of the binder.

According to these processes, it is disclosed that ceramic granules having improved flowability, relatively a good mold-packing property, and a crushing property at a low pressure of the ceramic granules can be obtained.

However, these techniques have the following drawbacks:

(1) Since these techniques concern the improvement of aqueous slurry, the granulation process is restricted to the spray-drying process using a spray dryer, leading to poor popularization.
(2) Although the flowability and the crushing property at a low pressure of the ceramic granules are somewhat improved, the something to further improved has been still left. Also, the green body produced by the use of such ceramic granules has insufficient dimensional accuracy. Further, these ceramic granules are not suitable for producing a ceramic green body having a complicated shape.
(3) The ceramic granules are sometimes collapsed during the course of the storage, transportation, or packing them into a mold.
(4) When being molded in a mold, the fine ceramic particles are stuck to the mold, which in some cases makes it impossible to continuously produce ceramic green bodies.

SUMMARY OF THE INVENTION

Consequently, a first object of the present invention is to provide a ceramic granule excelling in the flowability, the mold-packing property, and the anti-sticking property, and having a well-balanced properties of conflicting properties of the crushing property at a low pressure and the anti-collapse property, and capable of continuously producing ceramic green bodies.

A second object of the present invention is to provide a highly dense ceramic green body having a high molding density and a sintered body obtainable by sintering the green body.

We have made an assiduous study in research in light of the above situation. As a result, it has been found that the use of a polyvinyl alcohol having specific characteristics attains these and other objects, leading to the present invention.

According to the first aspect of the present invention, there is provided a ceramic granule for a ceramic green body containing a raw material ceramic powder and a binder component comprising a polyvinyl alcohol, said polyvinyl alcohol having an average saponification degree of not less than 90.0 mol % and not more than 98.0 mol %.

In this ceramic granule, the polyvinyl alcohol component preferably comprises a polyvinyl alcohol having an average saponification degree of not less than 94.5 mol % and not more than 15 97.5 mol %. Also, the amount of the polyvinyl alcohol added is preferably not less than 0.2 parts by weight and not greater than 10 parts by weight based on 100 parts by weight of the ceramic raw material powder.

According to the second aspect of the present invention, there provide a ceramic green body obtainable from such a ceramic granule for a ceramic green body, and according to the third aspect of the present invention, there provided a ceramic sintered body obtainable by sintering such a ceramic green body.

DESCRIPTION OF PREFERRED EMBODIMENTS

Figure 1:
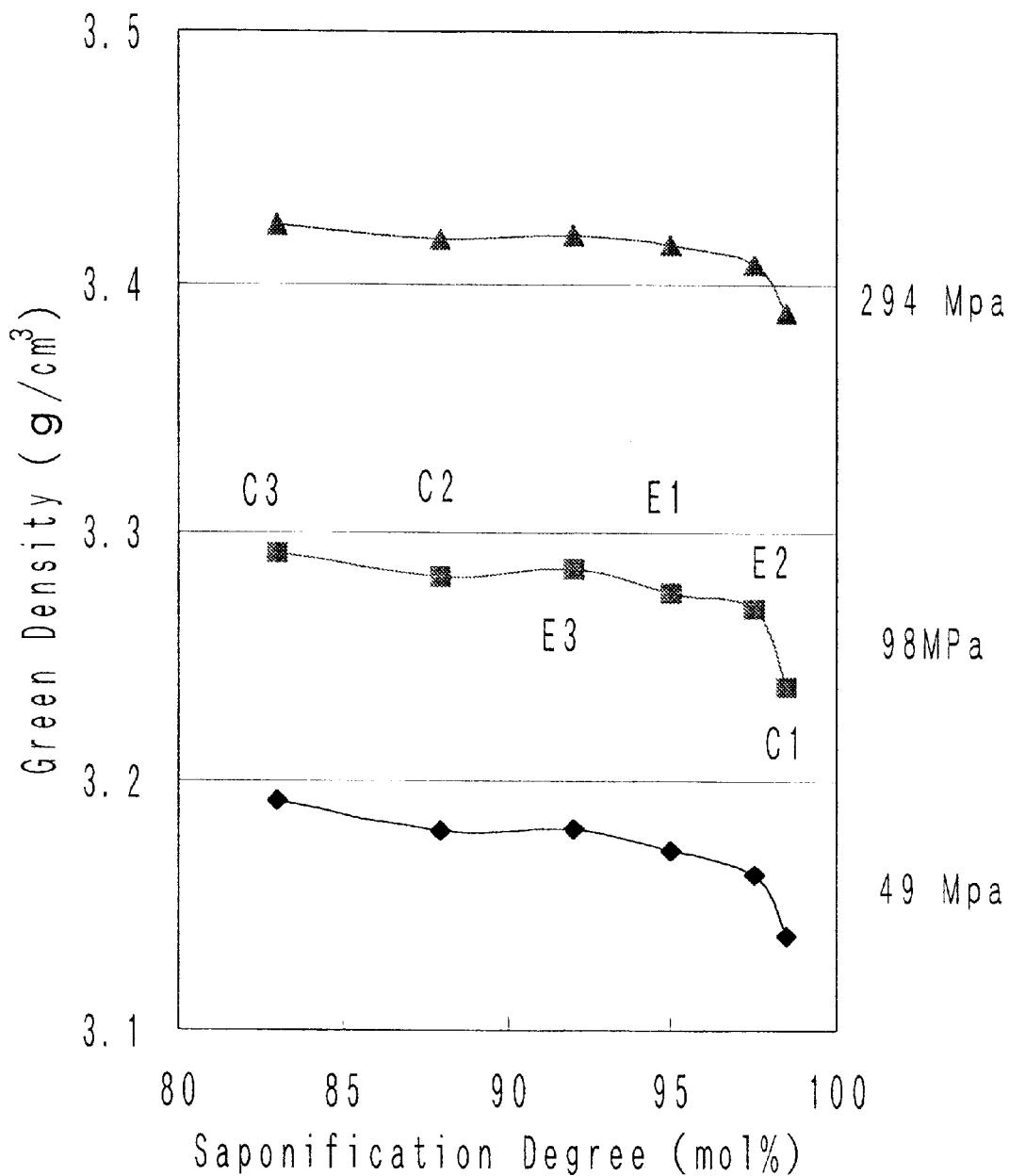
FIG. 1 is a graph showing the relations between the molding pressure and the green density in Examples of the present invention and Comparative Examples based on the saponification degree.

Embodiments of the present invention will now be described.

The ceramic granules according to the first aspect of the present invention are mainly composed of ceramic raw material powders and a binder. The ceramic raw material powders used herein are appropriately selected depending upon the application of the ceramic sintered body finally produced, and are not restricted. Typical examples include, but are not restricted to, metal oxide ceramics such as ferrite, alumina, and zirconia; non-metal oxide ceramics such as silicon carbide and silicon nitride; composite compounds such as barium titanate salts, and titanate zirconate salts; and the like. These ceramic powders may be used singly or as a mixture of two or more thereof. The resultant ceramic granule may be also composed of a mixture of ceramic granules produced from different ceramic powders. The particle size of the ceramic powder may be within the range which has been conventionally utilized as the raw material of the final ceramic product, i.e., the ceramic sintered body, and is generally in the range of from 0.5 to 5 $\mu$m, preferably from 0.7 to 3 $\mu$m. The ceramic raw material powder having such an average particle size can be obtained by any conventional process known in the art such as pulverization in a ball mill, a stirring mill, and an attritor in either a wet process or a dry processes.

The ceramic granules of the present invention contain a specific polyvinyl alcohol as a binder component. Generally, the binder components function as binding agents for primary particles, i.e., agents for binding the one raw material powder and another raw material powder, and have an influence upon crushing property at a low pressure and an anti-collapse property of the ceramic granule.

Specifically, an average saponification degree of the polyvinyl alcohol according to the present invention should be not less than 90.0 mol % and not more than 98.0 mol %, preferably not less than 94.5 mol % and not more than 97.5 mol %, as a whole. If the total saponification degree is less than 90.0 mol %, good crushing property at a low pressure can be obtained, anti-collapse property and anti-sticking properties become worse. In this case, since such a polyvinyl alcohol has good solubility in water, slurry can easily be prepared and, thus, it is suitable for use in granulation by spray drying. However, in the case of the granulation by oscillating extruding, the materials are stuck to the net, making it impossible to continuous granulation. Conversely, if the total saponification degree is greater than 98.0 mol %, although good anti-collapse property can be obtained, the resulting ceramic granule becomes relatively hard, leading to poor crushing property at a low pressure. Also, in this case, poor solubility in water makes it difficult to prepare slurry.

With regard to the total average saponification degree of the polyvinyl alcohol used according to the present invention, although the polyvinyl alcohol having an average saponification degree within this range can, of course, be used, a blend of a polyvinyl alcohol having an average saponification degree of less than 90.0 mol % and a polyvinyl alcohol having an average saponification degree of not less than 98.0 mol % may be used. Particular preference is given to singly use a polyvinyl alcohol having an average saponification degree within this range. In the case where a blend totally having an average saponification degree within this range composed of the polyvinyl alcohol having an average saponification degree of less than 90.0 mol % and a polyvinyl alcohol having an average saponification degree of not less than 98.0 mol % is used, although the drawbacks described above can sufficiently be solved, the improvement is lower than the polyvinyl alcohol (hereinafter referred to as "intermediately saponified polyvinyl alcohol") having an average saponification degree within this range. Consequently, the single use of intermediately saponified polyvinyl alcohol or blends of two or more of intermediately saponified polyvinyl alcohols are particularly preferred.

The amount of the specific polyvinyl alcohol utilized in the present invention as the binder component is preferably from 0.2 to 10 parts by weight, particularly from 0.6 to 2 parts by weight, based on 100 parts by weight of the raw material powder. If the amount is less than 0.2 parts by weight, in some cases, ceramic particles cannot be granulated. Conversely, if it exceeds 10 parts by weight, the resulting ceramic granules becomes too hard so that a crushing property becomes the worse, remaining a large amount of grain boundary, which sometimes causes molding defective. Also, mass defect would be increased.

The polyvinyl alcohol which can be used in the present invention is not specifically restricted, as long as it totally has the specific saponification degree defined above, and examples include those which have a polymerization degree (molecular weight) that have been conventionally utilized as the binder, which may or may not be modified, for example, with an alkylvinyl ether, allyl acetate, an amide, vinyl sillane or the like.

The polyvinyl alcohol having the specific saponification degree can be used as a binder to produce the granule according to the present invention by granulating ceramic powder through the method known per se, i.e., a spray-drying or oscillating extruding. The average particle size of the ceramic granule thus obtained is usually from 40 to 500 microns, preferably from 70 to 300 microns, and more preferably from 80 to 150 microns. If the average particle size is less than 40 microns, the flowability and the ability for being packed in the mold become worse. In this case, there is also a tendency that the size and the weight of one granule become uneven. Furthermore, there is a tendency that fine particles are stuck onto the mold (the generation of sticking). Conversely, if the average particle size is greater than 500 microns, a large amount of grain boundary sometimes remains to thereby increase the fraction defective of the green body. In this case, the size of green body and the weight of one granule are sometimes widely distributed.

In the present invention, various optional components, which have been conventionally utilized, may be added at the time of the granulation into the green body. Typical examples of the additives are dispersing agents such as polycarboxylates, and condensed naphthalene sulfonic acid; plasticizers such as glycerin, glycols, and triols; lubricants such as waxes, and stearic acid and salts thereof; organic macromolecular aggregating agents such as polyether-, urethane modified polyether-, polyacrylic acid-, and modified acrylic acid-macromolecules; inorganic aggregating agents such as aluminum sulfate, aluminum chloride, and aluminum nitrate; and the like.

The terms "the range for maintaining a flowability sufficient for incorporating the ceramic granule in the mold for the ceramic production" used herein is intended to a range in which the ceramic granule to be packed can be uniformly packed in the mold without sticking the granules to the filling means and aggregating the ceramic granules.

As for the flowability of the ceramic granule, although it cannot be decided unconditionally because it depends upon the process to be granulated, i.e., shape of the ceramic granule, but in the present invention, a time (second/50 g) required for dropping 50 g of the ceramic granules from a funnel is utilized as a standard for the flowability as defined in JIS Z-2502. The flowability of the ceramic granule produced by a spray drying process is preferably in the range of from 18 to 24 seconds/50 g, and that produced by an oscillating extruding process is preferably from 20 to 34 seconds/50 g.

The term "balanced properties of a crushing property at a low pressure and an anti-collapse property" used herein means that the ceramic granule has properties that it is not collapsed under the conditions of transportation or of storage and that it is well crushed when the ceramic granule according to the present invention is molded at a low pressure in a mold (typically from 29.4 to 147.0 MPa).

EXAMPLES

The present invention will now be described by referring to Examples and Comparative Examples. However, it should be noted that the present invention is not restricted to the following Examples.

Examples 1 to 3 and Comparative Examples 1 to 3

Granulated powders were prepared by adding 17 parts by weight of aqueous solutions (Nos. 1 to 6) of polyvinyl alcohol having 6% by weight of solid concentration as shown in Table 1 to 100 parts by weight of Ni—Cu—Zn ferrite powders, followed by mixing, stirring and granulating in a TM mixer (manufactured by Mitsui Mining Corporation). The resultant granulated powder was dried over a belt type dryer, and extruded into granules by means of an oscillating extruding pulverizer, SINGLE GRANULATOR, (manufactured by Nippon Seiki Co., Ltd). Thereafter, the particle size of the granule was regulated by a shifter to obtain an oscillating extruded granule having an average particle size of 200 $\mu$m. Subsequently, the granules were molded in a dry manner using a mold for ceramic green bodies having a diameter of 6.0 mm varying the mold pressure from 49.0 to 294.0 Mpa.

Figure 2:
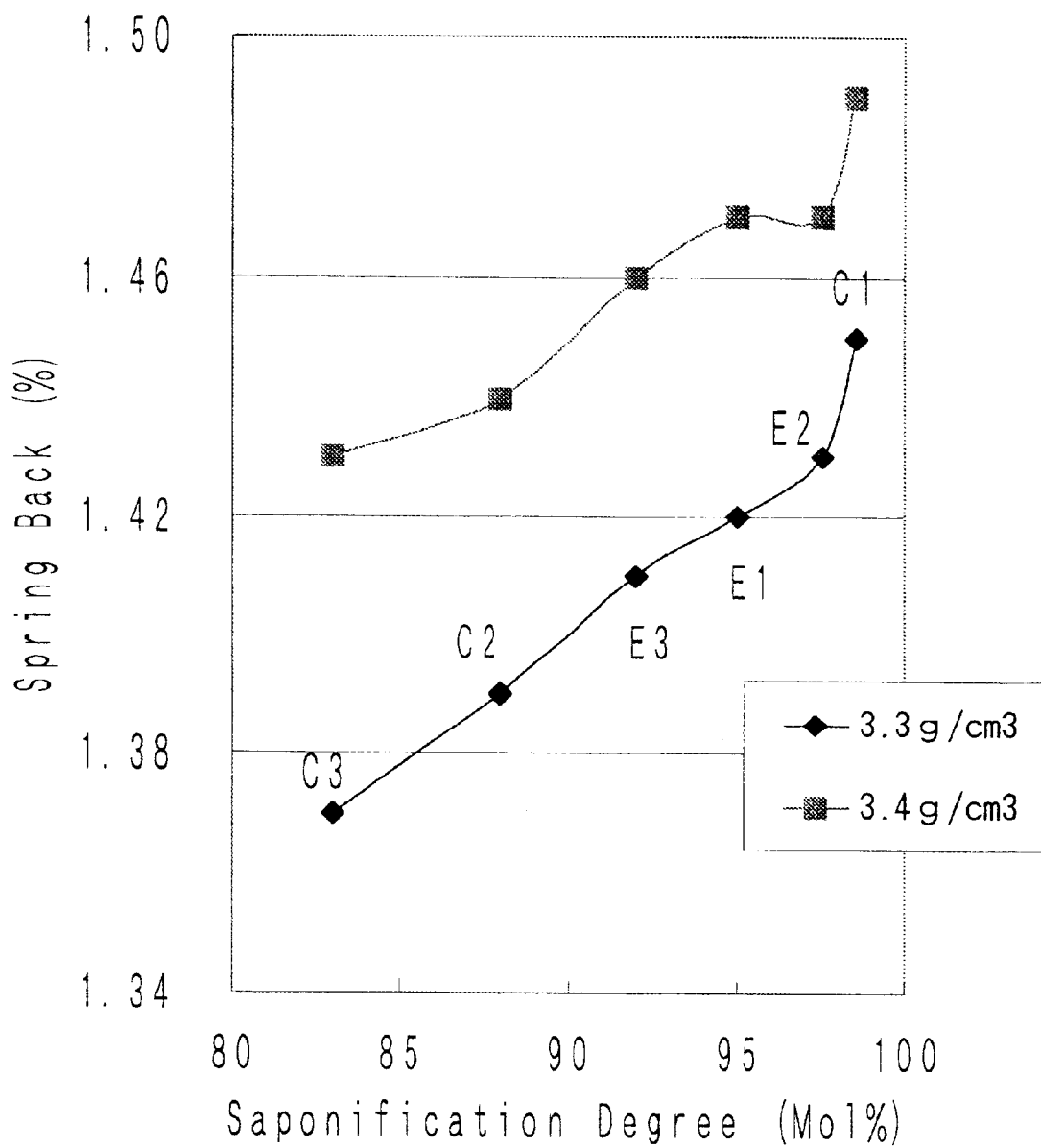
FIG. 2 is a graph showing the relations (spring back change) between the green density and the expanding rates of the green bodies in Examples of the present invention and Comparative Examples based on the saponification degree.
Figure 3:
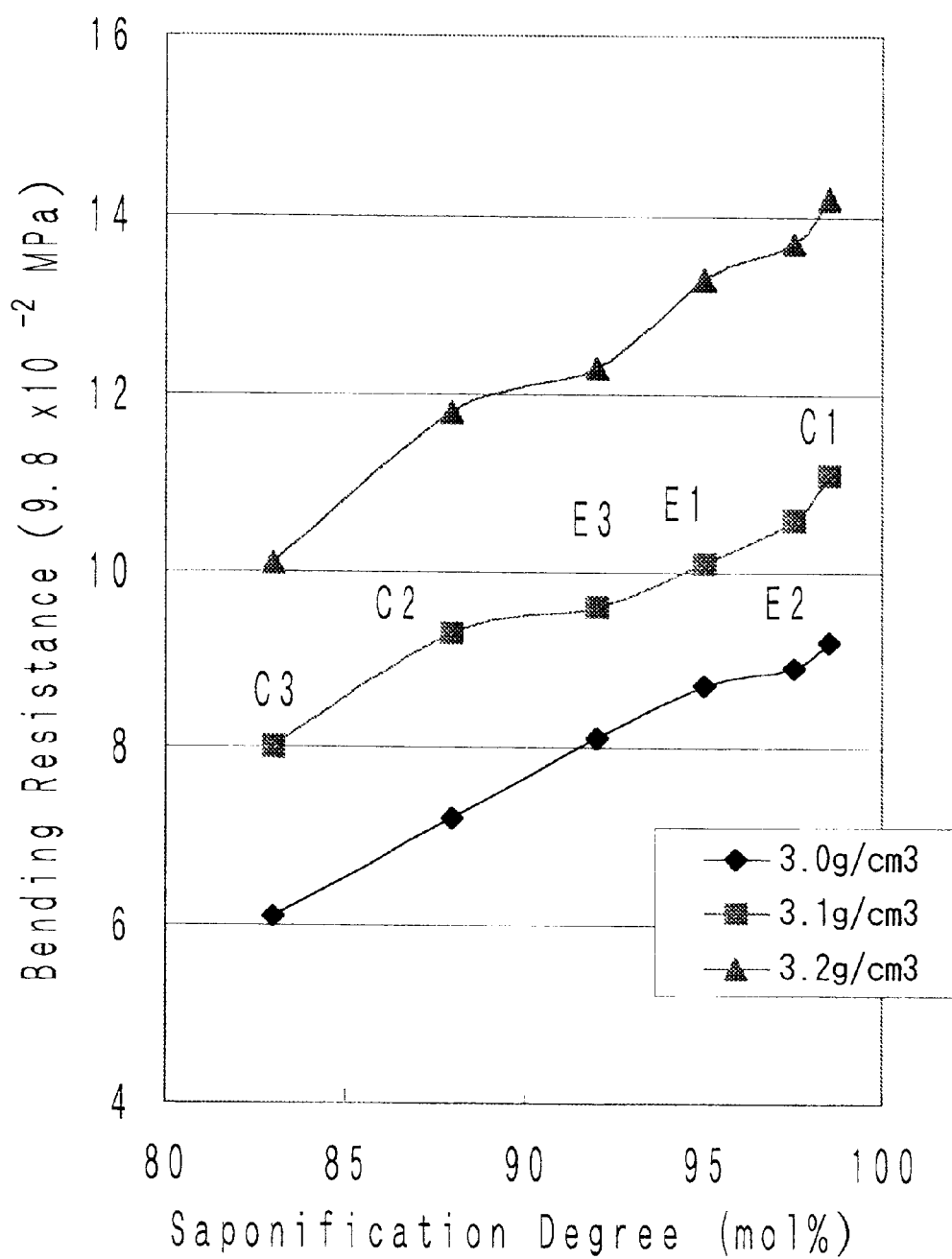
FIG. 3 is a graph showing the relations between the molding pressure and the bending resistance of the green bodies in Examples of the present invention and Comparative Examples based on the saponification degree.

FIG. 1 shows the relations between the molding pressure and the green density based on the saponification degree, FIG. 2 shows the relations (spring back change) between the green density and the expanding rates of the green bodies based on the saponification degree, and FIG. 3 shows the relations between the molding pressure and the bending resistance of the green bodies based on the saponification degree. In the relation between the molding pressure and green density shown in FIG. 1, higher the green density in the same pressure, better the green body is. In the relations (spring back change) shown in FIG. 2 between the green density and the expanding rates of the green body, lower spring back is assumed to be better (i.e., if the spring back value becomes higher, the crack tends to be brought about). In the relations between the molding pressure and the bending resistance of the green bodies shown in FIG. 3, a green body having a higher bending resistance is assumed to be good.

TABLE 1

| | PVA No. | Saponification degree (mol %) | Polymerization Degree | Concentration (% by weight) |
|---|---|---|---|---|
| Example 1 | 1 | 95.0 | 1700 | 6.0 |
| Example 2 | 2 | 97.5 | 1700 | 6.0 |
| Example 3 | 3 | 92.0 | 1700 | 6.0 |
| Comparative Example 1 | 4 | 98.5 | 1700 | 6.0 |
| Comparative Example 2 | 5 | 88.0 | 1700 | 6.0 |
| Comparative Example 3 | 6 | 83.0 | 1700 | 6.0 |

References 1 to 3

Ceramic green bodies were obtained in the same manner as in Examples 1 to 3 and Comparative Examples 1 to 3, except for using blends shown in Table 2 as the polyvinyl alcohols.

Figure 4:
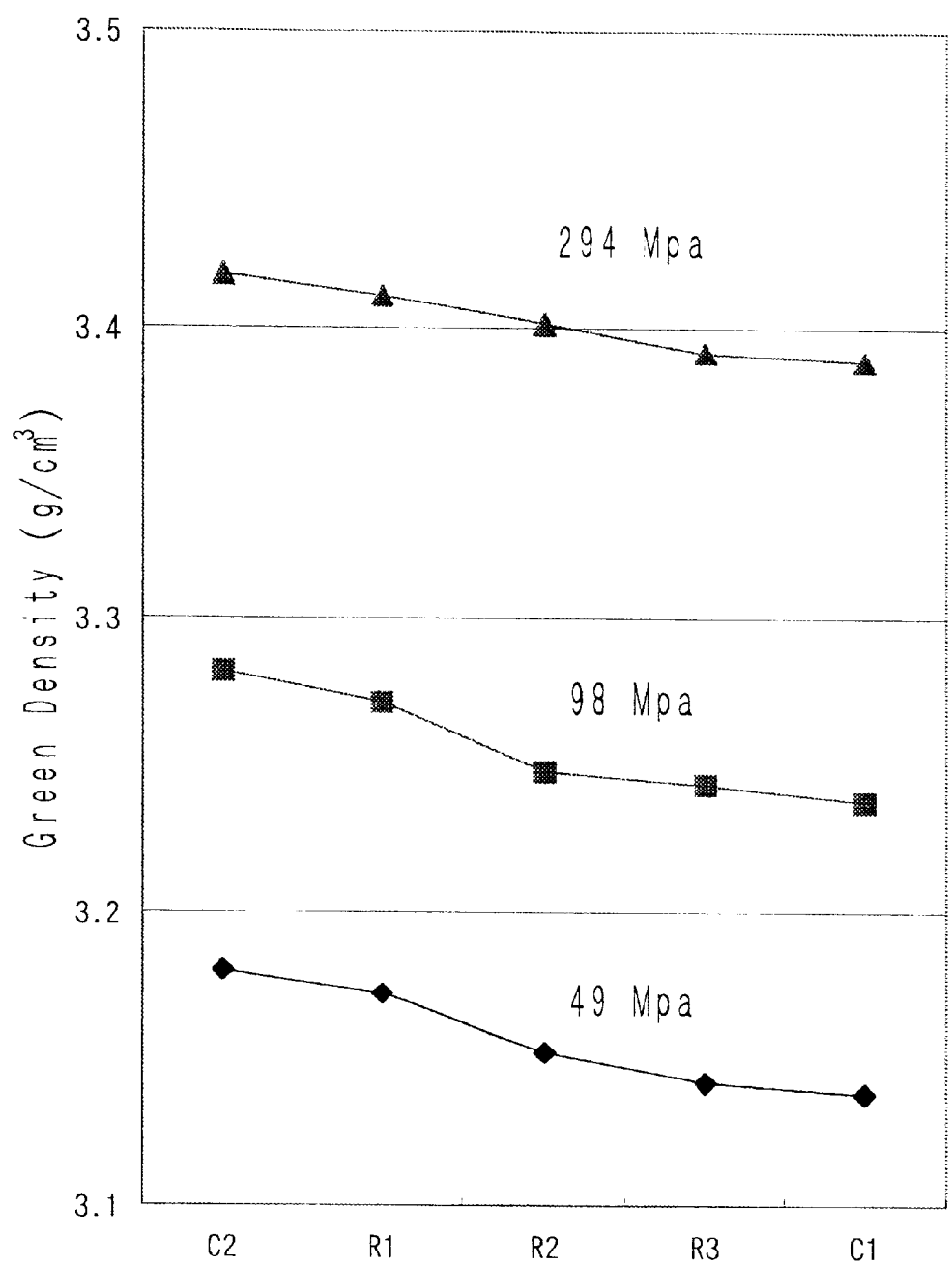
FIG. 4 is a graph showing the relations between the molding pressure and the green density in References of the present invention based on the saponification degree.
Figure 5:
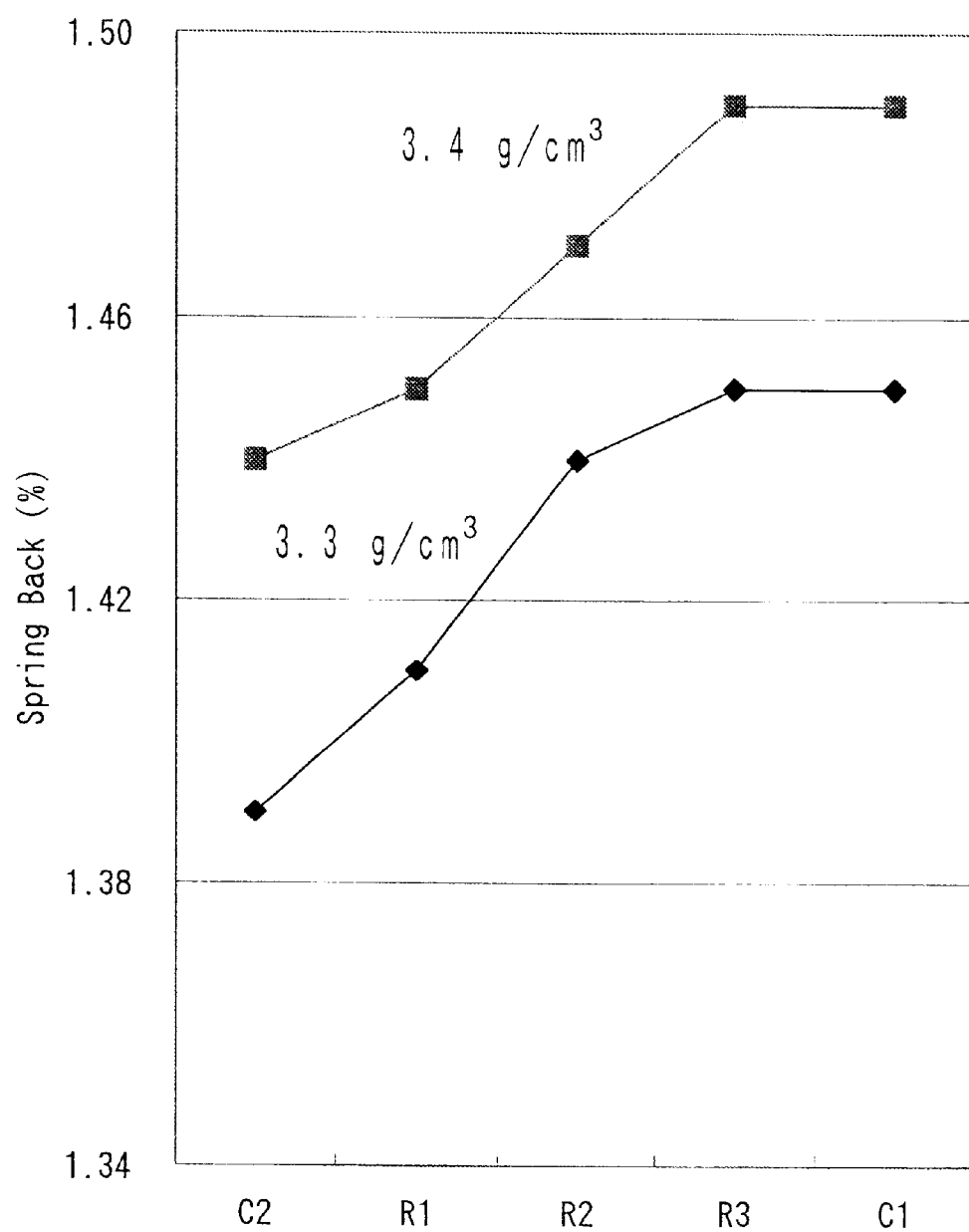
FIG. 5 is a graph showing the relations (spring back change) between the green density and the expanding rates of the green bodies in References of the present invention based on the saponification degree.
Figure 6:
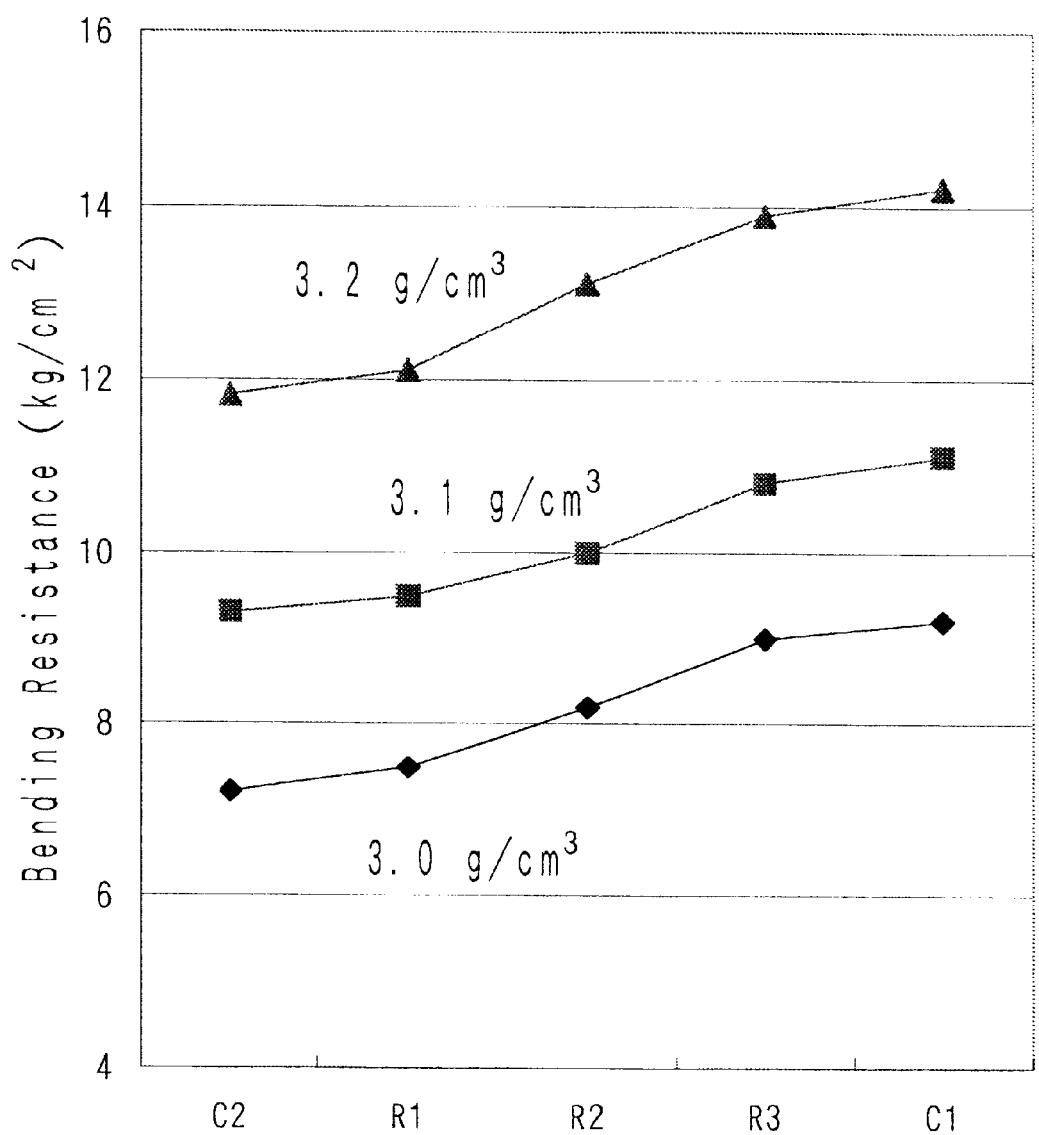
FIG. 6 is a graph showing the relations between the molding pressure and the bending resistance of the green bodies in References of the present invention based on the saponification degree.

FIG. 4 shows the relations between the molding pressure and the green density based on the saponification degree, FIG. 5 shows the relations (spring back change) between the green density and the expanding rates of the green bodies based on the saponification degree, FIG. 6 shows the relations between the molding pressure and the bending resistance of the green bodies based on the saponification degree.

In FIGS. 4 to 6, the values obtained in Comparative Example 1 (using polyvinyl alcohol having an average saponification degree of 98.5) and of Comparative Example 2 (using polyvinyl alcohol having an average saponification degree of 88.0) are also listed.

TABLE 2

| | PVA No. | Blend Ratio (%) 98.5 mol | Blend Ratio (%) 88.0 mol | Concentration (% by weight) |
|---|---|---|---|---|
| Comparative Example 1 | 4 | 100 | 0 | 6.0 |
| Reference 1 | 13 | 80 | 20 | 6.0 |
| Reference 2 | 14 | 50 | 50 | 6.0 |
| Reference 3 | 15 | 20 | 80 | 6.0 |
| Comparative Example 2 | 5 | 0 | 100 | 6.0 |

From the results of FIGS. 1 to 3, it has been understood that Examples 1 to 3 using polyvinyl alcohols each having a saponification degree within the present invention obtain good results in all of the items. In contrast, in the case of Comparative Examples 1 to 3 using polyvinyl alcohols each having a saponification degree deviated from the range of the present invention, unsatisfied results were obtained in any of the items.

As for references using the blends of the perfectly saponified polyvinyl alcohol with partially saponified polyvinyl alcohol, the results, which were slightly inferior to those of Examples 1 to 3 but satisfied to some degrees, were obtained.

Examples 4 to 6 to Comparative Examples 4 to 6

Figure 7:
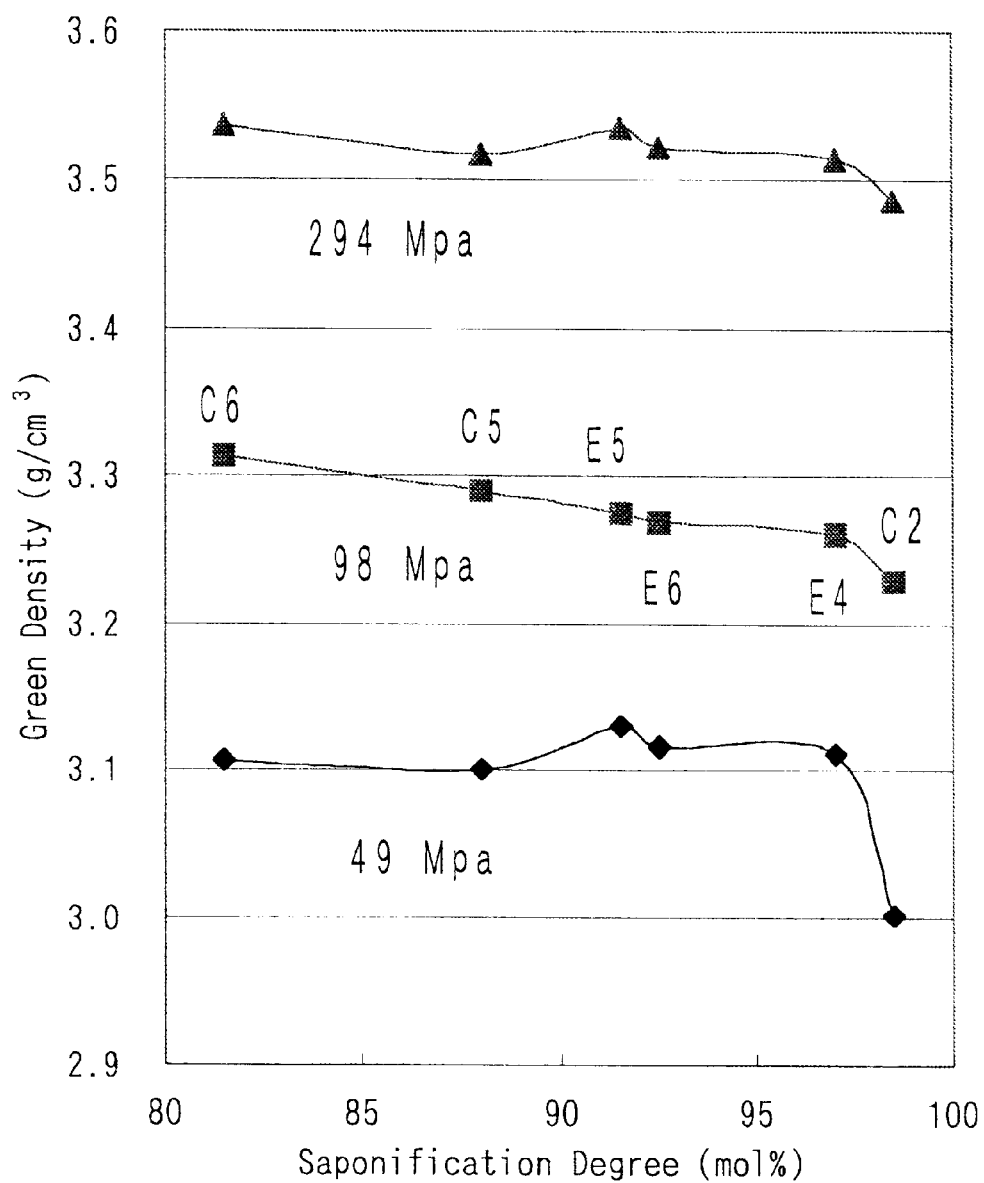
FIG. 7 is a graph showing the relations between the molding pressure and the green density in another Examples of the present invention and Comparative Examples based on the saponification degree.
Figure 8:
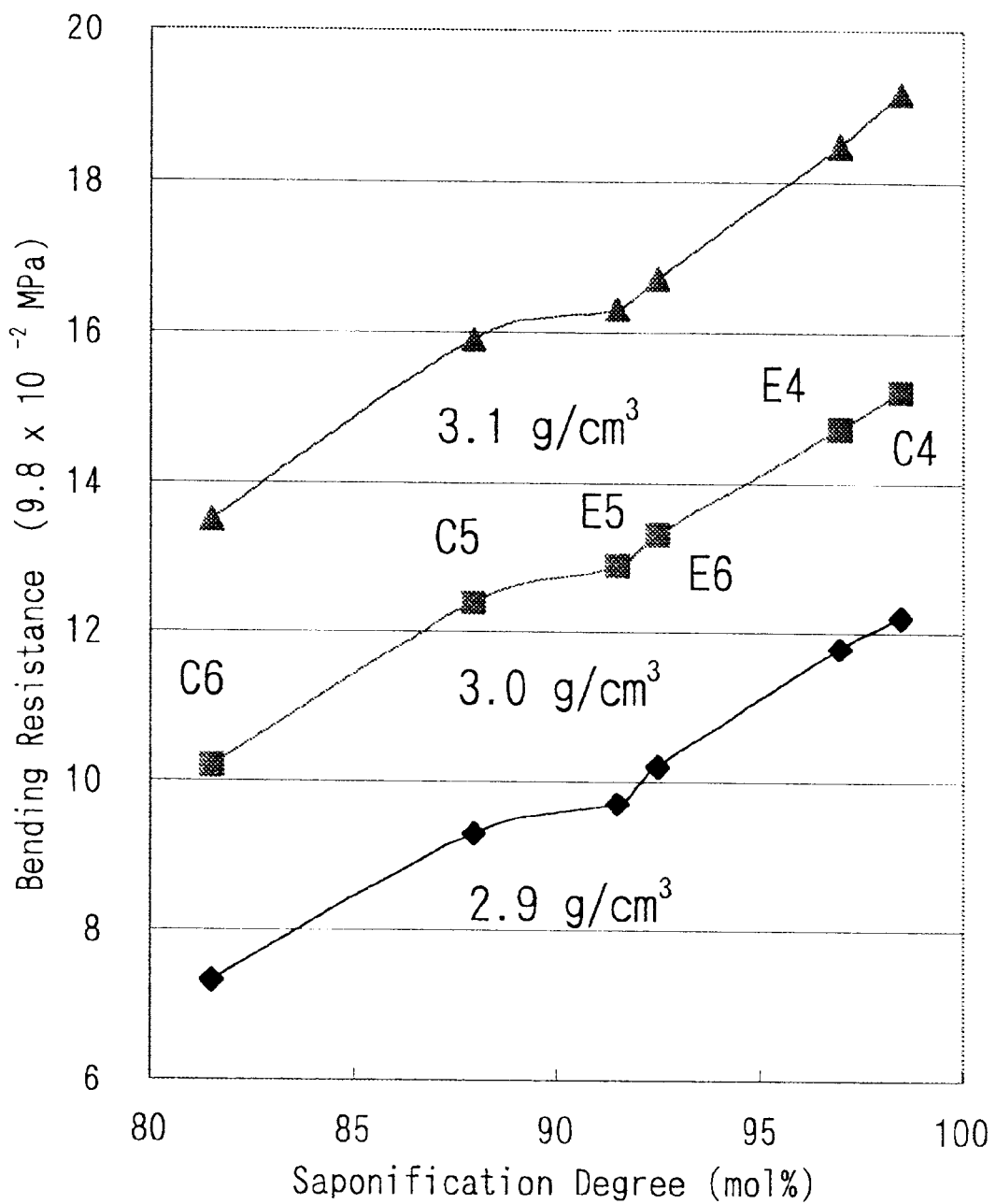
FIG. 8 is a graph showing the relations between the molding pressure and the bending resistance of the green bodies in another Examples of the present invention and Comparative Examples based on the saponification degree.

Ferrite slurries were prepared by wet-pulverizing 66 parts by weight of Ni—Cu—Zn ferrite powders, 28 parts by weight of water, 6 parts by weight of aqueous polyvinyl alcohol solutions (Nos.7 to 12) shown in Table 3 each having a solid concentration of 12% by weight, and 0.25 parts by weight of ammonium polycarbonate. The resulting slurry was spray dried by the use of a spray drier to obtain a spherical ceramic granule having an average particle size of 125 μm. Subsequently, green bodies are produced as in Examples 1 to 3 and Comparative Examples 1 to 3. FIG. 7 shows the relations between the molding pressure and the green density based on the saponification degree, and FIG. 8 shows the relations between the molding pressure and the bending resistance of the green bodies based on the saponification degree. The results obtained are similar to those of Examples 1 to 3 and Comparative Examples 1 to 3.

TABLE 3

| | PVA No. | Saponification degree (mol %) | Polymerization Degree | Concentration (% by weight) |
|---|---|---|---|---|
| Example 4 | 7 | 97.0 | 500 | 12.0 |
| Example 5 | 8 | 91.5 | 600 | 12.0 |
| Example 6 | 9 | 92.5 | 600 | 12.0 |
| Comparative Example 4 | 10 | 98.5 | 500 | 12.0 |
| Comparative Example 5 | 11 | 88.0 | 500 | 12.0 |
| Comparative Example 6 | 12 | 81.5 | 500 | 12.0 |

Example 7

The ferrite granules obtained from Examples 1 to 3 and Comparative Examples 1 to 3 were tested for their destroying strengths by means of an apparatus for determining hardness of particle, marketed under the trade name of GRANDO from Okada Seiko Co. Ltd. The relations between hardness and destroying strengths of particles are shown in FIGS. 9 and 10.

Figure 9:
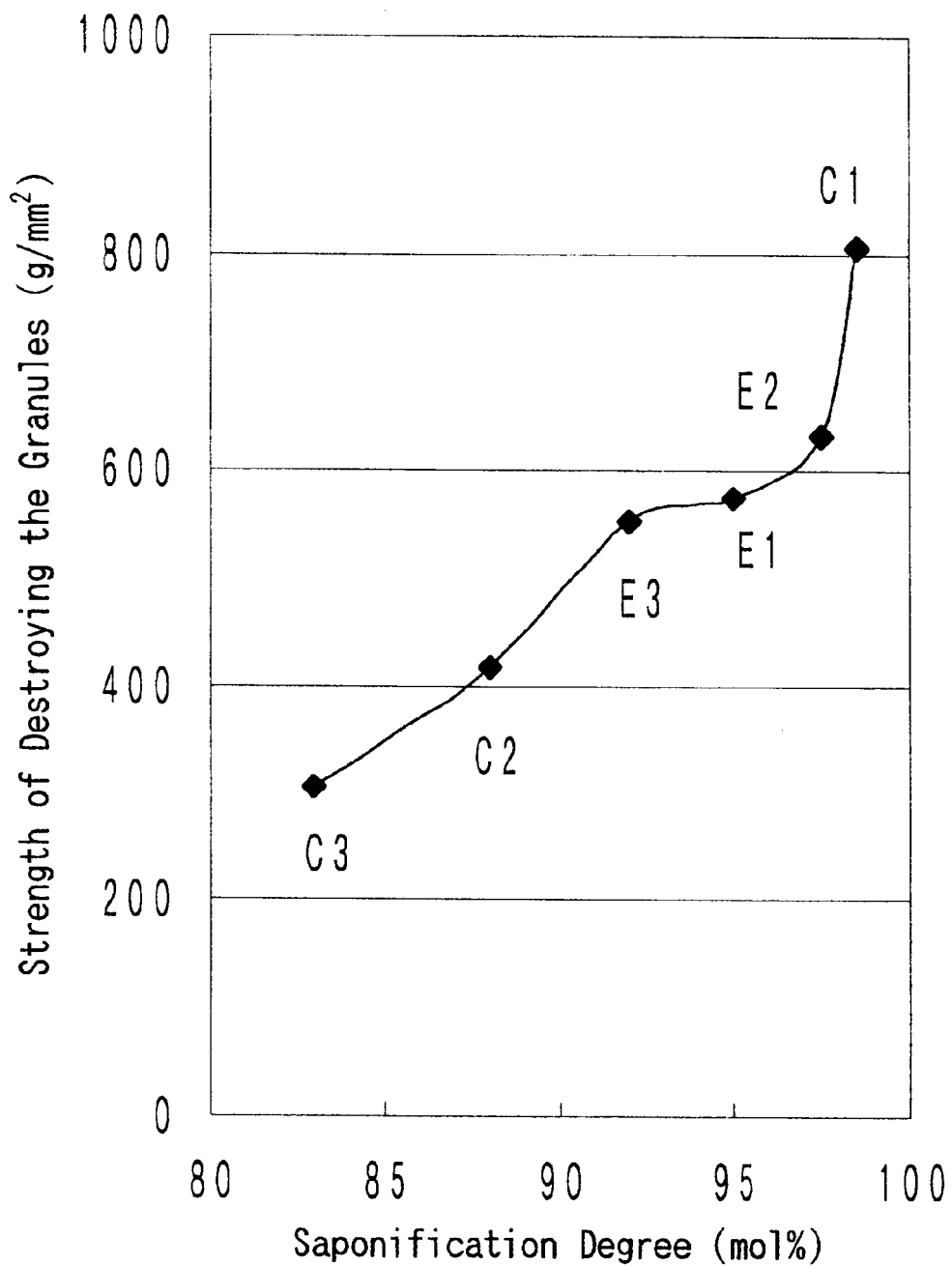
FIG. 9 is a graph showing the relations between the saponification and strength of destroying the granules of the green bodies in Examples of the present invention and Comparative Examples.
Figure 10:
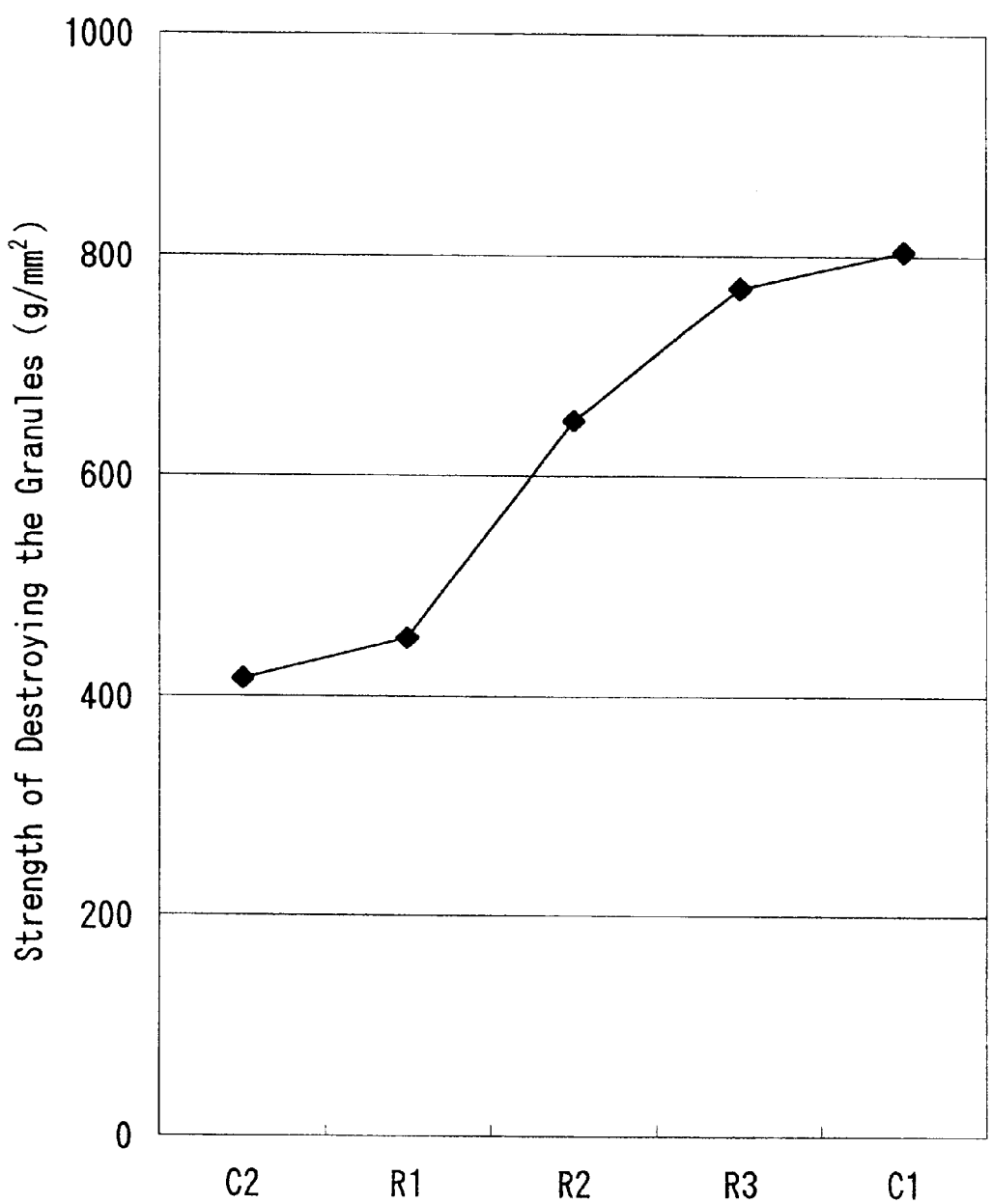
FIG. 10 is a graph showing the relations between the saponification and strength of destroying the granules of the green bodies in References of the present invention.

As is clear from FIGS. 9 and 10, it has been proven that the destroying strengths of ferrite granules from Examples 1 to 3 and from References 1 to 3 are within appropriate range.

Example 8

The ferrite granules obtained from Examples 1 to 3 and Comparative Examples 1 to 3 were continuously molded into 10,000 cylindrical cores measuring 2.3 mm in diameter, 2.8 mm in length. The resulting green bodies were ground into drum cores by means of a diamond wheel, and then sintered at 1,050 C to provide sintered bodies. Tables 4 and 5 show the results of criteria of the resulting green bodies and flowability of the green bodies.

TABLE 4

| | Example 1 95.0 | Example 2 97.5 | Example 3 92.0 | Comparative Example 1 98.5 | Comparative Example 2 88.0 | Comparative Example 3 83.0 |
|---|---|---|---|---|---|---|
| Green body | | | | | | |
| Sticking | Excellent | Excellent | Excellent | Excellent | Good | Poor |
| Crack | Excellent | Good | Excellent | Poor | Excellent | Excellent |
| Deviation in size | Excellent | Excellent | Excellent | Excellent | Good | Poor |
| Sintered body | | | | | | |
| Crack | Excellent | Good | Excellent | Poor | Excellent | Excellent |
| Deviation in size | Excellent | Excellent | Excellent | Excellent | Good | Poor |
| Deviation in Inductance | Excellent | Excellent | Excellent | Excellent | Good | Poor |
| Others | | | | | | |
| Workability | Excellent | Excellent | Excellent | Excellent | Poor | Poor |
| Flowability | 29 | 28 | 30 | 28 | 33 | 35 |
| Criteria | | | | | | |
| | Excellent | | Good | | Poor | |
| Sticking | Not generated | | Generated at 5000 | | Generated at 1000 | |

TABLE 4-continued

| Crack | 0–5 | 6–20 | 21–50 |
|---|---|---|---|
| Deviation in Size | 10–25 μm | 26–35 μm | 36–50 μm |
| Deviation in Inductance | 0.10–0.20 μH | 0.21–0.30 μH | 0.31–0.50 μH |
| Workability | No blockage of Net | — | Blockage of Net |

TABLE 5

|  | Comparative Example 1 98.5:88.0 100:0 | Reference 1 98.5:88.0 80:20 | Reference 2 98.5:88.0 50:50 | Reference 3 98.5:88.0 20:80 | Comparative Example 2 98.5:88.0 0:100 |
|---|---|---|---|---|---|
| Green body |  |  |  |  |  |
| Sticking | Excellent | Excellent | Excellent | Good | Good |
| Crack | Poor | Poor | Good | Excellent | Excellent |
| Deviation in size | Excellent | Excellent | Good | Good | Good |
| Sintered body |  |  |  |  |  |
| Crack | Poor | Poor | Good | Excellent | Excellent |
| Deviation in size | Excellent | Excellent | Good | Good | Good |
| Deviation in Inductance | Excellent | Excellent | Good | Good | Good |
| Others |  |  |  |  |  |
| Workability | Excellent | Excellent | Poor | Poor | Poor |
| Flowability | 28 | 29 | 30 | 32 | 33 |
| Criteria |  |  |  |  |  |
|  | Excellent | Good | Poor |  |  |
| Sticking | Not Generated | Generated @ 5000 | Generated @ 1000 |  |  |
| Crack | 0–5 | 6–20 | 21–50 |  |  |
| Deviation in Size | 10–25 μm | 26–35 μm | 36–50 μm |  |  |
| Deviation in Inductance | 0.10–0.20 μH | 0.21–0.30 μH | 0.31–0.50 μH |  |  |
| Workability | No blockage of Net | – | Blockage of Net |  |  |

From the results of Table 4, it is understood that the green bodies produced from the ferrite granules of Examples 1 to 3 using the polyvinyl alcohols each having saponification degree within the range of the present invention were free from the sticking, had a small frequency of cracking, very small deviations in sizes, indicating that they satisfied all of the required items. In contrast, in the cases of the green bodies produced from the ferrite granules of Comparative Examples 1 to 3 using the polyvinyl alcohols each having saponification degree deviated from the range of the present invention, any one or more of the criteria amongst sticking, the generation of cracking, and deviation in sizes are inferior to the green bodies obtained from ferrite granules of Examples 1 to 3 as raw materials.

Similarly, the ceramic sintered bodies obtained from the ceramic granules of Examples 1 to 3 satisfied all of the items in comparison with the sintered bodies obtained from the ceramic granules of Comparative Examples 1 to 3.

From the results of Table 5, in the green bodies produced from the ferrite granules of References 1 to 3 using the blends of the perfectly saponified polyvinyl alcohol with partially saponified polyvinyl alcohol, all of the items, the generation of sticking, had a small frequency of cracking, very small deviations in sizes were inferior to those from Examples 1 to 3, but they were better than those from Comparative Examples 1 to 3. Particularly, in the green body using a 1:1 blend of perfectly saponified polyvinyl alcohol with partially saponified polyvinyl alcohol has good results except for workability, although it is somewhat inferior to the green bodies using the ferrite granules of Examples 1 to 3.

As described above, according to the present invention, a ceramic granule containing a raw material ceramic powder and a binder component comprising a polyvinyl alcohol, in which the polyvinyl alcohol possesses an average saponification degree of not less than 90.0 mol % and not more than 98.0 mol % has a well-balanced properties of conflicting properties of the crushing property at a low pressure and the anti-collapse property, and capable of continuously producing a ceramic product.

What is claimed is:

1. A ferrite granule containing a ferrite powder and a binder component comprising a polyvinyl alcohol, wherein an average saponification degree of said polyvinyl alcohol is not less than 90.0 mol % and not more than 98.0 mol %, and said polyvinyl alcohol added is not less than 0.2 parts by weight and not greater than 10 parts by weight based on 100 parts by weight of the ferrite powder.

2. The ferrite granule as claimed in claim 1, wherein the average saponification degree of said polyvinyl alcohol is not less than 94.5 mol % and not more than 97.5 mol %.

3. The ferrite granule as claimed in claim 1, wherein said polyvinyl alcohol added is not less than 0.6 parts by weight and not greater than 2 parts by weight based on 100 parts by weight of said ferrite powder.

4. The ferrite granule as claimed in claim 1, wherein said polyvinyl alcohol component consists essentially of a polyvinyl alcohol having an average saponification degree of not less than 90.0 mol % and not more than 98.0 mol %, and said polyvinyl alcohol added is not less than 0.2 parts by weight and not greater than 10 parts by weight based on 100 parts by weight of the ferrite powder.

5. The ferrite granule as claimed in claim 4, wherein said polyvinyl alcohol has average saponification degree of not less than 94.5 mol % and not more than 97.5 mol %.

6. The ferrite granule as claimed in claim 4, wherein said polyvinyl alcohol added is not less than 0.6 parts by weight and not greater than 2 parts by weight based on 100 parts by weight of the ferrite powder.

7. The ferrite granule as claimed in claim 1, wherein an average particle size of said ferrite powder is within the range of from 0.5 to 5 $\mu$m.

8. The ferrite granule as claimed in claim 7, wherein the average particle size of said ferrite powder is within the range of from 0.7 to 3 $\mu$m.

9. The ferrite granule as claimed in claim 1, wherein said ferrite granule is produced by granulating the ferrite powder through the method of spray-drying, and the average particle size of a ferrite granule is within the range of from 40 to 500 $\mu$m.

10. The ferrite granule as claimed in claim 9, wherein said ferrite granule is produced by granulating the ferrite powder through the method of spray-drying, and the average particle size of the ferrite granule is within the range of from 70 to 300 $\mu$m.

11. The ferrite granule as claimed in claim 9, wherein said ferrite granule is produced by granulating the ferrite powder through the method of spray-drying, and the average particle size of the ferrite granule is within the range of from 80 to 150 $\mu$m.

12. The ferrite granule as claimed in claim 1, wherein said ferrite granule is produced by granulating the ferrite powder through the method of oscillating extruding, and the average particle size of the ferrite granule is within the range of from 40 to 500 $\mu$m.

13. The ferrite granule as claimed in claim 12, wherein said ferrite granule is produced by granulating the ferrite powder through the method of oscillating extruding, and the average particle size of the ferrite granule is within the range of from 70 to 300 $\mu$m.

14. The ferrite granule as claimed in claim 12, wherein said ferrite granule is produced by granulating the ferrite powder through the method of oscillating extruding, and the average particle size of the ferrite granule is within the range of from 80 to 150 $\mu$m.

15. A ferrite green body obtained from a ferrite granule for producing a ferrite green body as claim 1.

16. A ferrite green body obtained from a ferrite granule for producing a ferrite green body as claim 4.

17. The ferrite granule as claimed in claim 1, wherein said ferrite granule is produced by granulating ferrite powder through the method of oscillating extruding, and strength of destroying the granules of the green bodies is not less than about 400 g/mm$^2$ and not greater than about 800 g/mm$^2$.

* * * * *